United States Patent [19]

Markowitz

[11] 4,395,845
[45] Aug. 2, 1983

[54] PLANT PROTECTOR

[76] Inventor: Edward M. Markowitz, 116 Hampton Way, Merrick, N.Y. 11566

[21] Appl. No.: 271,391

[22] Filed: Jun. 8, 1981

[51] Int. Cl.³ .............................................. A01G 9/00
[52] U.S. Cl. .......................................... 47/32; 47/66
[58] Field of Search ...................................... 47/32–33, 47/66, 84; 220/305, 306–307, 352, 363

[56] References Cited

U.S. PATENT DOCUMENTS

| 193,246 | 7/1877 | Spoorsingel . | |
| 915,897 | 3/1909 | Skorness . | |
| 2,785,508 | 3/1957 | Coleman, Jr. | 47/34 |
| 3,618,260 | 11/1971 | Convey, Jr. et al. | 47/32 |
| 3,891,423 | 6/1975 | Stanley et al. | 71/86 |
| 3,961,443 | 6/1976 | Insalaco | 47/32 |

FOREIGN PATENT DOCUMENTS

| 859392 | 12/1970 | Canada | 47/32 |
| 2521881 | 11/1976 | Fed. Rep. of Germany | 47/32 |

Primary Examiner—Robert E. Bagwill
Attorney, Agent, or Firm—Darby & Darby

[57] ABSTRACT

A plant protector in the form of a disk-like cover is adapted to be friction fitted within a flower pot. The cover is provided with an interior hole to allow a plant to pass through it. At least one cut is provided in the cover from the hole to the outer edge so that it may be placed about a plant growing in the pot.

9 Claims, 3 Drawing Figures

PLANT PROTECTOR

BACKGROUND OF THE INVENTION

The present invention relates to devices for protecting plants and, more particularly, to a device for protecting potted plants.

Plants which are grown indoors in flower pots have long been very popular with the public because they are attractive and it is believed that they improve the air in a room by absorbing carbon dioxide and giving off oxygen. However, there are some problems in growing such plants. In particular, heated rooms tend to be very dry and thus the moisture in the pots evaporates rapidly. Thus, frequent watering may be necessary. Also, people tend to use the pots as ashtrays for cigarette and cigar ashes. These ashes upset the chemical balance in the soil and may injure the plant. Further the pots may be knocked over so that the soil spills out. This not only may injure the plant, it may make a mess in the room which is difficult to clean up.

In the past various devices have been proposed to protect plants against various hazards. For example, U.S. Pat. No. 915,897 to Skorness describes a cover with two sections with mating half circles, which sections are hinged together. When these sections have been placed about a plant so that it extends through the opening formed by the half circles, the sections are fastened together. Then the sections, which rest on the upper rim of the flower pot, act as a protection against cigarettes or other injurious matter being thrown into the earth in the flower pot. Further, the cover tends to reduce the evaporation of moisture from the soil. However, this particular cover will not prevent soil from spilling from the pot if it should be tipped over. The same is true of a herbicidal-containing protective cover illustrated in U.S. Pat. No. 3,891,423 to Stanley et al.

Some plant protective covers have been proposed which are also capable of preventing spillage of the soil. These include the covers in Design patent No. 193,246 to Spoorsingel and utility U.S. Pat. Nos. 2,785,508 to Coleman, 3,618,260 to Convey et al. and 3,961,443 to Insalaco. These covers have a major draw back to their use; they are suitable for only one size pot. Each has a locking mechanism that is adapted to the rim size of a particular pot and thus, they cannot be used on a variety of sizes. Further because of these locking mechanisms, the installation and removal of the cover from the pot is not without its problems.

SUMMARY OF THE INVENTION

The present invention is directed to a protective cover for a potted plant that will keep moisture in the soil within the pot, will keep foreign material out of the soil, and will prevent the soil from spilling out of the pot when the pot is tipped over. Also, the cover is to be inexpensive, easy to use and suitable for a variety of different size pots.

In an illustrative embodiment of the invention the plant protector is a circular cover with a hole in its center through which the plant may extend. In order to get the cover about a plant already growing in soil in a flower pot, a radial cut is provided in the cover from the central hole to the outer edge. At some point along the cut a tongue-and-groove shape is formed. By flexing the cover at the cut it can be placed about the plant and the tongue-and-groove parts snapped together to close the cut. The outer edge of the cover is slightly bevelled so that it can be wedged within pots of various sizes. In most cases the mere wedging of the cover into the pot is sufficient to prevent soil spillage in the event the pot is tipped over.

In a preferred embodiment of the invention the upper side of the cover is provided with vertical grips that can be seized to permit easy removal of the cover from the pot. Also, a radial score line opposite the radial cut can be provided in the cover in order to make it easier to flex. Further, a flexible plastic material can be used for the cover in order to improve its flexability and to reduce its cost.

BRIEF DESCRIPTION OF THE DRAWINGS

The foregoing and other features of the present invention will be more readily apparent from the following detailed description of exemplary embodiments and the accompanying drawings wherein.

DESCRIPTION OF EXEMPLARY EMBODIMENTS

Figure 1:
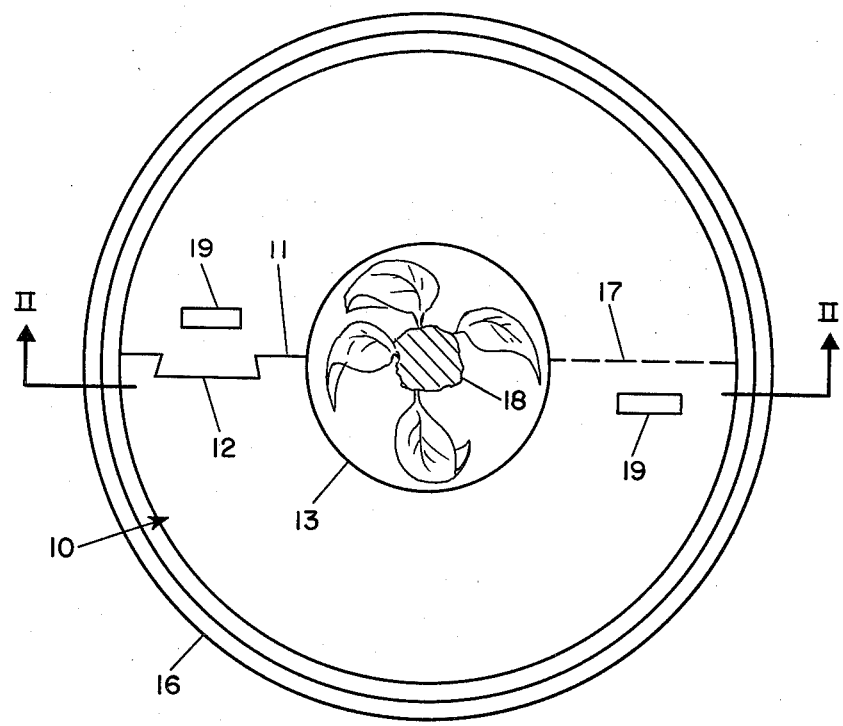
FIG. 1 is a plan view of the plant protector of the present invention installed in a flower pot.
Figure 2:
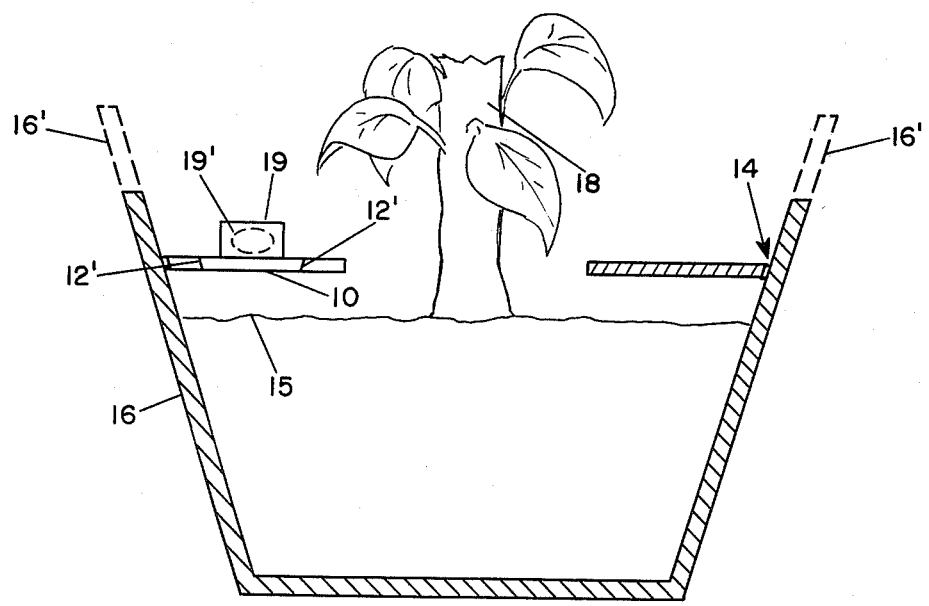
FIG. 2 is a sectional view along line II—II of the flower pot and plant protector of FIG. 1.

In FIGS. 1 and 2 there is shown a plant protector 10 that may be made by injection molding a flexible plastic, e.g. PVC., that is clear, opaque or translucent and in any desired color or pattern to improve the appearance of the plant. If desired the protector can also be stamped from thin metal sheets or made of any other suitable material. The protector 10 as shown in FIGS. 1 and 2 is made as a unitary circular cover with an interior hole 13 so as to accommodate a plant 18 growing in soil 15 within a flower pot 16. A radial cut 11 extends from the hole 13 to the outer edge of cover 10. Along this cut a tongue-and-groove connection 12 is formed so that the cover can be flexed open and placed around or removed from the plant 18. As best seen in FIG. 2 the walls 12' of the connection 12 are tapered inwardly so that the edges of the cover can be snapped together securely. Vertically directed grip handles 19 are positioned on the upper surface of the protector so that it can be lifted from the flower pot.

As a means of increasing the flexability of the cover so that it can be placed about a plant, a radial score line 17 is provided in the cover opposite the radial cut. Also, the cover can be made with a reduced thickness to improve its ability to flex open.

Figure 3:
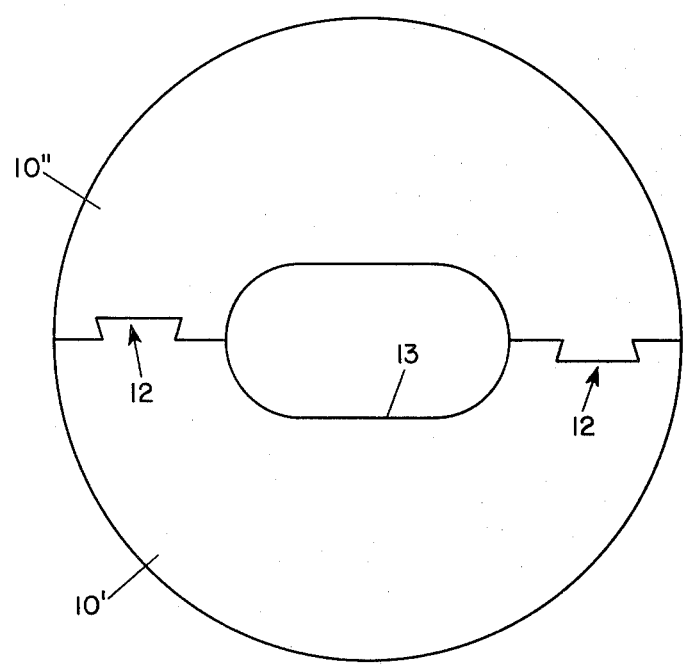
FIG. 3 is a plan view of an embodiment of the present invention adapted for use in a flower pot having at least two plants.

In FIG. 3 another embodiment of the invention is shown. The same reference numbers are used in FIG. 3 as are used in FIG. 1 to indicate corresponding parts. The protector of FIG. 3 is formed in two independent half circular sections 10', 10''. Two tongue-and-groove connections 12 are provided so that these sections can be snapped together about a plant. With the design of FIG. 3 the internal hole 13 is made oblong so that the protector can accommodate two or more plants. Because of the two section design it is not necessary for the cover to be flexible and as a result, it can be made from a wider variety of materials.

To use the plant protectors of FIGS. 1 and 3, they must first be opened either by flexing or by separating the two sections. Then the protector or protector sections are positioned about the plant and fastened together by the tongue-and-groove connection or connections. Once secured about the plant the protector is wedged into the flower pot. To aid in this the outer edges of the protector are inwardly tapered, e.g. by about 5°. A different amount of taper may be selected for use with flower pots having different shapes. In addition the outer edge of the cover may be coated with an elastic material 14 to increase its coefficient of friction, if desired, in order to improve the holding ability of the cover in the pot to avoid spillage in the event the pot is tipped over.

Once installed as shown in FIG. 2 the cover beneficially increases and keeps constant the root temperature of the plant, and reduces evaporation so as to keep the soil moist. Further the soil is protected from tobacco ashes and will tend to remain in the pot if it is tipped over. If toxic fertilizers are used on the plant, the protector will prevent children and pets from coming into contact with them. The protector can also act as a support for ash trays and drinks.

The cover will fit in a variety of different pot sizes, e.g. it will fit not only the pot 16 shown in solid line in FIG. 2, but also the larger pot 16' shown in dotted line in that figure. The only difference is that the cover becomes wedged in the pot at a relatively lower level as the size of the pot increases.

If it is desired to remove the cover, the grip handles 19 are seized and pulled upwardly to unseat the cover from the pot. Finger holes 19' can be provided in the handles to make this lifting action easier. Once the cover has been unseated, the tongue-and-groove connection or connections are opened and the protector is removed from about the plant.

While the invention has been particularly shown and described with reference to preferred embodiments thereof, it will be understood by those skilled in the art that various changes in form and details may be made therein without departing from the spirit and scope of the invention.

I claim:

1. A plant protector for protecting at least one plant growing in soil in a flower pot comprising a relatively flat disc-like cover having an upper surface, a lower surface and outer edges, said cover defining an interior hole through which the plant may pass, the outer periphery of said cover having a shape corresponding to the interior dimensions of the flower pot so that it can fit within the flower pot unsupported by the upper rim of the pot, the outer edges of said cover having an inward taper shape in the direction toward the lower surface such that the cover may be wedged in the pot in a friction-tight manner, at least one cut being provided in the cover from the interior hole to the outer edge so that the cover may be opened from the outer edge to the hole and passed about or removed from the plant, and fastening means provided along said cut for locking together the segments of the cover on opposite sides of the cut, said fastening means including a tongue-and-groove connection formed by the cut.

2. A plant protector as defined in claim 1, wherein the cover is made of a flexible plastic material, there is one cut from the outer edge to the hole and the cover can be flexed to open it from the outer edge to the hole so that it can be passed about or removed from the plant.

3. A plant protector as claimed in claim 1 wherein there are two cuts from the outer edge to the hole such that the cover can be divided into two segments, tongue and groove fastening means being provided along each cut so that the segments can be attached together.

4. A plant protector as defined in claim 1, wherein the hole is circular and permits one plant to pass through the cover.

5. A plant protector as defined in claim 1, wherein the hole is oblong and permits more than one plant to pass through the cover.

6. A plant protector as defined in claim 1, wherein said tongue-and-groove connection tapers inward in the direction towards the lower surface of the cover.

7. A plant protector as defined in claims 1, further including grip handles extending from the upper surface of the cover.

8. A plant protector as defined in claim 1 wherein the outer edges are provided with a surface having a high coefficient of friction.

9. A plant protector as defined in claim 8, wherein the high coefficient of friction surface is made of an elastic material.

* * * * *